April 21, 1964     R. F. GILL, JR., ETAL     3,129,463
COMPACTING PRESS

Filed Sept. 28, 1961     3 Sheets-Sheet 1

Inventors
ROBERT F. GILL, JR.
ROLAND E. KRIEGER
By Wallace, Kinzer and Dorn
Attorneys

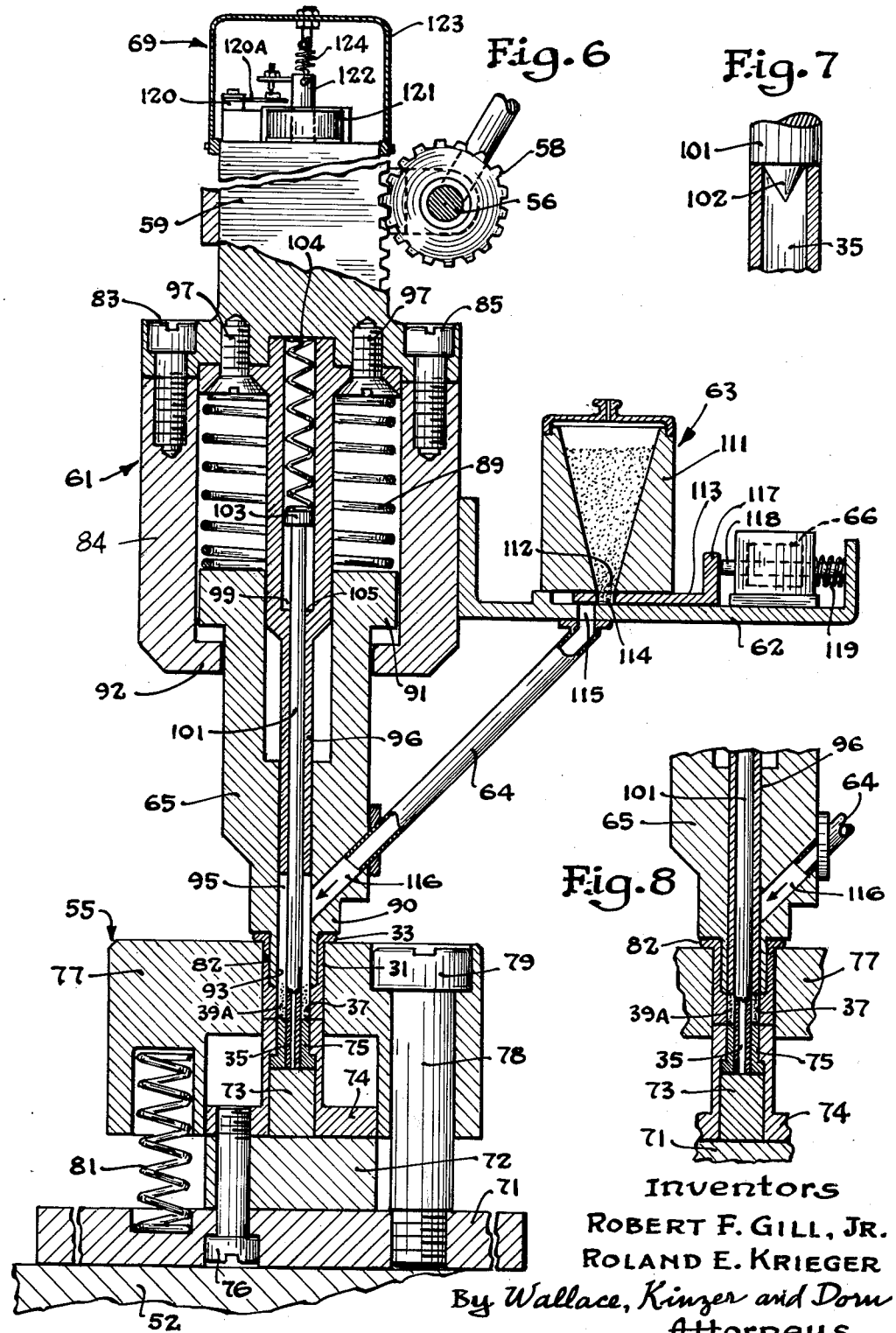

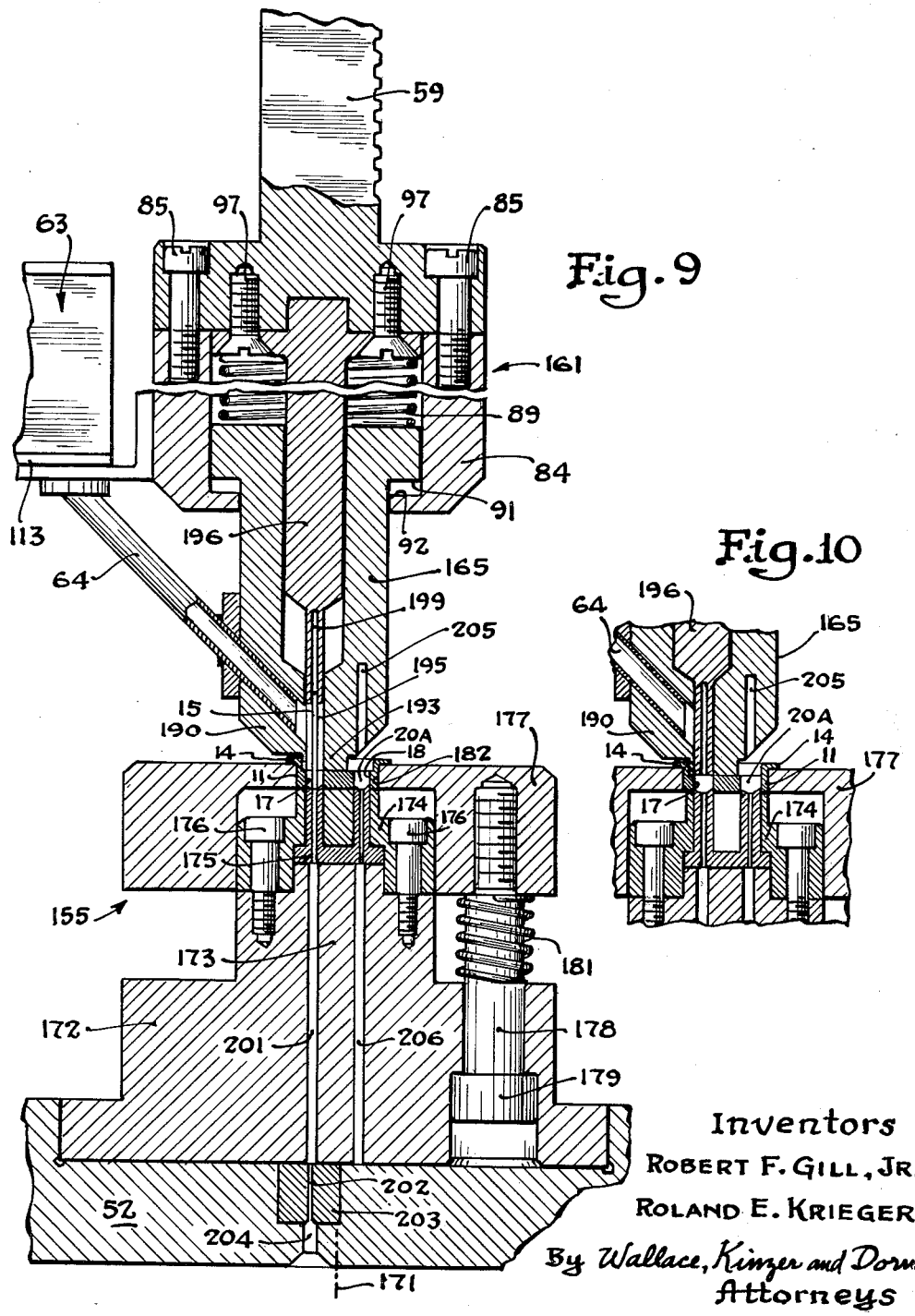

United States Patent Office 3,129,463
Patented Apr. 21, 1964

3,129,463
COMPACTING PRESS
Robert F. Gill, Jr., La Grange, and Roland E. Krieger, Hinsdale, Ill., assignors to Scully-Anthony Corporation, La Grange, Ill., a corporation of Illinois
Filed Sept. 28, 1961, Ser. No. 141,348
7 Claims. (Cl. 18—16)

This invention relates to a new and improved compacting press and more particularly to a press suitable for use in the manufacture of a compressed powder element disposed upon and in intimate contact with a base member. Specifically, the compacting press of the invention is adapted for use in the manufacture of vitreous insulator elements, used in electrical feed-through structures or the like, the base member usually comprising a section of a metal housing for an electrical or electronic device.

A variety of different electrical and electronic components, including switches, transistors, diodes, and piezoelectric crystals, must be housed in hermetically sealed metal enclosures for many applications. An enclosure of this kind may comprise a substantially cup-shaped base having one or more electrical conductors extending through apertures in the base. A second cup-shaped member may complete the enclosure, and it may also be necessary to provide one or more electrical conductors extending through this portion of the housing as well. The conductors for the device must be insulated from each other and from the housing. Moreover, the insulator elements of the housing should afford, in each instance, a physically rugged airtight seal. The specifications for electrical and electronic components of this kind are frequently quite rigid with respect to overall strength, shock resistance, and related requirements.

In the fabrication of housings for electrical and electronic components of the kind noted hereinabove, it has been customary to use glass pre-forms. In assembling a typical housing, an electrical conductor is disposed within the central aperture of a doughnut-shaped pre-form. The pre-form and conductor are then mounted in place in an aperture in the metal housing. The assembled elements are fired to vitrify the glass and form the desired seal by "wetting" the conductor and the metal support with the glass prior to solidification by cooling.

An improved technique is described in detail and claimed in the co-pending application of Myron L. Anthony, Serial No. 139,515, filed September 20, 1961. In this process, a desiccated glass powder is compacted to high density in situ in the aperture of the metal housing, the electrical conductor being disposed in position in the aperture at the time the powder is compacted. The compressed glass powder or frit is then fired at a temperature high enough to vitrify the glass, thereby solidifying the glass and sealing it to the metal support and to the conductor.

The Anthony method affords substantially improved results, as compared with prior art techniques, with respect to physical strength, uniformity, and electrical characteristics of the insulator element. For optimum results, however, this particular method involving compaction in situ requires that the glass powder be protected from more than very limited contact with the atmosphere in order to avoid the formation of bubbles and other defects in the resulting insulator element. Moreover, the best results are achieved, utilizing this method, if the glass powder is subject to substantial vibration during the compaction operation. On the other hand, the housing itself may be rendered useless if any loose powder is scattered over the surface, except in the area where the insulator is to be formed, since glass particles within the housing could adversely affect the operation of the electronic or electrical component sealed therein.

It is a principal object of the present invention, therefore, to provide a new and improved compacting press, suitable for use in the manufacture of a compressed vitreous powder element on a metal base member, that is capable of rapid operation yet which affords uniform compaction of the powder.

A particular object of the invention is to provide a new and improved compacting press, for use in the manufacture of electrical feed-through structures or like composite vitreous-metal members, that may be easily adapted to a variety of different shapes of metal bases and to a variety of different shapes of vitreous elements sealed thereto.

A particular object of the present invention is to provide a new and improved ram structure for a compacting press that permits the depositing of a powder material on a closely defined and restricted portion of a base member, followed by compaction of the powder in situ on the base member, yet which makes it possible to complete the depositing and compaction operation rapidly in order to avoid possible contamination of the powder due to contact with the air.

An additional object of the invention is to utilize vibration of a compacting press for fabricating compressed powder elements on individual base members for the dual purpose of improving the feeding of the powder to a predetermined compaction location and of improving the compression of the powder itself. A principal feature of the invention, utilized in this regard, entails the utilization of a vibratory device, mounted directly upon the ram of a compacting press, that vibrates the ram in a direction parallel to the direction of movement thereof during the compression operation.

A further object of the invention is to provide accurate guiding and aligning means for a compacting press utilizing the manufacture of miniature compressed powder elements subsequently formed into insulators in or on relatively small metal base members such as the housings for miniature electronic and electrical devices.

Thus, the present invention is directed to a compacting press for use in a manufacture of a compressed powder element of predetermined size and configuration at a given location on a base member. Usually, a metal base member is involved and the compressed powder element is a compacted mass of glass powder that is subsequently fired to form an electrical insulator. A compacting press constructed in accordance with the invention comprises means for mounting the base member in predetermined position. A guide member is provided, this guide member having a guide aperture facing toward the given location on the base member. The guide member is movable between an initial position displaced from the base member and a second position in which the guide member effectively engages the base member. The press includes depositing means for depositing a predetermined quantity of powder at the aforementioned location on the base member, deposition being effected through a given portion of the guide aperture in the guide member. The compression ram of the press is movable through the guide aperture toward the base member to engage and compress the powder in situ on the base member. Actuating means are provided, in the press, for moving the guide member, actuating the depositing means, and moving the compression ram to its compression position, in the recited sequence.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 6 is a detail sectional view of a major portion of the operating components of the press of FIG. 5, illustrating the position of the parts of the press at an intermediate stage in its operation;

FIG. 7 is a detail sectional view, drawn to an enlarged scale, of a portion of a guiding device incorporated in the press mechanism of FIG. 6;

FIG. 8 is a sectional view of a part of the press mechanism, similar to FIG. 6 but showing the parts of the press in a different operating position;

FIG. 9 is a detail sectional view, similar to FIG. 6, of a press constructed in accordance with a different embodiment of the present invention; and FIG. 10 is a detail sectional view of a part of the apparatus of FIG. 9, showing the press parts in a different operating position.

Figure 1:
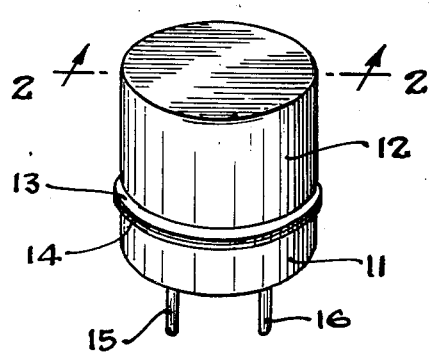
FIG. 1 is a perspective view of a typical electrical enclosure, the fabrication of which is facilitated by the press of the present invention.
Figure 2:
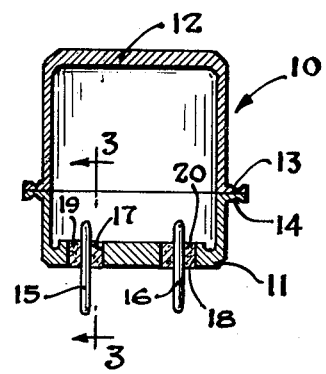
FIG. 2 is a sectional view taken approximately along line 2—2 in FIG. 1.

FIGS. 1 and 2 illustrate a metal enclosure 10 for an electrical or electronic device such as a vacuum switch, a transistor, a diode, a piezoelectric crystal, or the like. The enclosure 10 comprises a base 11 and a cap 12. As shown in FIG. 2, the base 11 and the cap 12 are both substantially cup-shaped members. The base member 11 is provided with a peripheral flange 13 and the cap 12 has a corresponding peripheral flange 14. The two housing members 11 and 12 may be physically joined by suitable means, such as by a cold welding technique. Usually, the base 11 and the cap 12 are fabricated from aluminum or an aluminum alloy, although other metals may be employed where desired.

The enclosure 10 further includes a pair of electrical conductors 15 and 16. Each of the conductors passes through an assigned opening in the base member 11, the openings being designated by the reference numerals 17 and 18. The conductors 15 and 16 are electrically insulated from the metal base member 11 by the vitreous insulator elements 19 and 20, respectively. The compacting press of the present invention, described in detail hereinafter, is utilized in an intermediate step in the fabrication of the electrical insulators 19 and 20.

Figure 3:
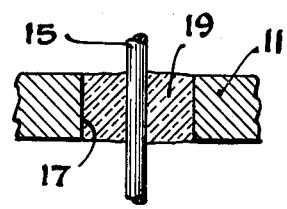
FIG. 3 is a detail sectional view, on an enlarged scale, of a part of the enclosure of FIG. 2, taken approximately as indicated by line 3—3 therein.

The sectional view afforded in FIG. 3 illustrates the physical appearance of the insulator element 19. The body of the insulator 19 is free of bubble inclusions. Moreover, the vitreous insulator displays good wetting characteristics with respect to the internal surfaces of the opening 17 in the metal base member 11 and with respect to the external surface of the conductor 15. The vitreous insulator 19 is physically strong and sound, and comprises a virtually 100% ceramic continuum characterized by a glass matrix containing a precipitated strengthening phase of virtually microscopic gem quality. This strengthening phase is indicated by the stippling in FIG. 3.

To obtain optimum physical and electrical characteristics in the seal 19, the seal is fabricated in accordance with the method set forth in the aforementioned co-pending application of Myron L. Anthony. Initially, the base member 11 and the conductor 15 are mounted in the position illustrated in FIGS. 2 and 3 with the conductor 15 located centrally of the aperture 17. A measured quantity of desiccated glass powder is then deposited in contact with the metal support member 11 within the confines of the aperture 17. The vitreous powder is then compressed to a high state of density. During compaction, the glass powder is confined to the desired insulator configuration. It is also desirable to restrain the edge or lip of the base member 11 around the aperture 17 to prevent deformation of the metal base member during the compaction process. Furthermore, the contact of the glass powder with the surrounding atmosphere is limited as much as possible to avoid contamination of the powder which might result in the formation of bubbles in the completed insulator 19. After compaction, the housing assembly is fired at a temperature high enough to vitrify the glass powder and solidify the insulator element in hermetic sealed relation to the conductor 15 and to the internal wall of the aperture 17 in the base member 11.

Figure 4:
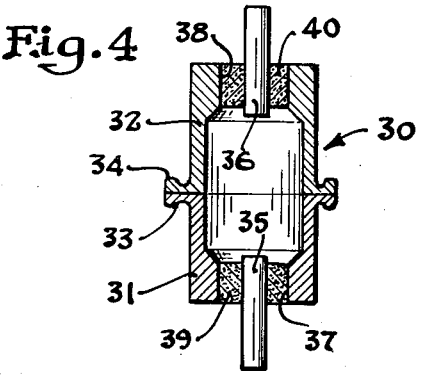
FIG. 4 is a sectional view, similar to FIG. 2, of a somewhat different form of electrical enclosure.

FIG. 4 illustrates, in a sectional view similar to FIG. 2, a somewhat different form of enclosure 30. The enclosure 30 includes an upper base member 32 joined to a lower base member 31, the joining surfaces for the two members 31 and 32 being afforded by the external flanges 33 and 34. The metal base member 31 is provided with a relatively large axial aperture 37 within which a cylindrical conductor 35 is supported by means of an encompassing annular vitreous insulator element 39. The other base member 32 is of similar construction and includes a relatively large aperture 38 within which a cylindrical conductor 36 is supported by means of an insulator and seal element 40.

Figure 5:
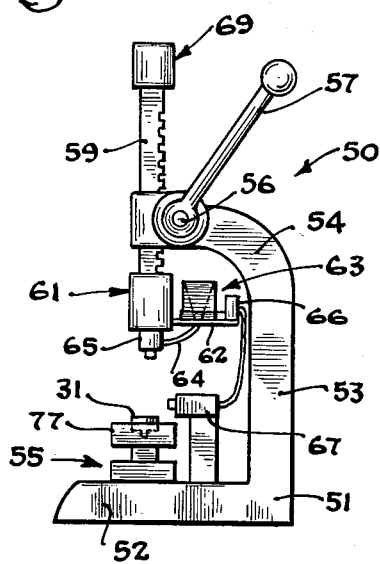
FIG. 5 is an elevation view of a compacting press constructed in accordance with one embodiment of the present invention.

FIG. 5 illustrates a compacting press 50 constructed in accordance with a preferred embodiment of the invention. The press 50 may be easily and conveniently modified to permit use in the fabrication of the housings of both of FIGS. 2 and 4, as described in greater detail hereinafter in connection with FIGS. 6–10.

The compacting press 50 includes a frame 51 of substantially C-shaped configuration, including a base 52 from which a vertical frame member 53 extends upwardly, the vertical frame member 53 terminating in a horizontal frame section 54. On the base section 52 of the frame 51, there is mounted a die block assembly 55. The die block assembly 55 affords a means for supporting a base member in predetermined position in the press. By way of example, the base member 31 (FIG. 4) may be mounted in the die block 55 for a compaction operation.

On the upper horizontal portion 54 of the frame 51, there is mounted a shaft 56 to which an operating handle 57 is affixed. The shaft 56 carries a spur gear 58 (see FIG. 6) that is in meshing engagement with an elongated rack member 59 as best shown in the assembly view of FIG. 5. The rack member 59 carries, at its lower end, a compression head assembly 61. The construction of the compression head 61, described in detail hereinafter, comprises an important feature of the present invention.

On the compression head 61 there is mounted a support bracket 62 that carries a powder depositing or dispensing device generally indicated by the reference numeral 63. The dispensing device 63 is connected by a flexible tube 64 to a guide member 65 that projects downwardly from the compression head 61 of the press. Actuation of the powder dispensing device 63 is effected by suitable means such as a solenoid 66 that may be energized by a limit switch 67 mounted on the base section 52 of the machine press.

The rack member 59 carries, at its upper end, a vibrator device 69. The construction of the vibrator device and its operation, as well as the construction and operation of the other major components of the press 50, can best be understood by reference to FIGS. 6–8.

As shown in FIG. 6, the die block assembly 55 includes a mounting plate 71 upon which there is mounted an anvil 72. The mounting plate 71 is secured to the base section 52 of the frame of the press by suitable means, such as a series of mounting bolts (not shown). The anvil 72 supports a pressure block 73 that is held in place by a die retaining member 74. The die retaining member 74 also holds a substantially cylindrical die 75 in place on the pressure block 73, the die 75 and the retaining member 74 being provided with complementary shoulders for this purpose. The retaining member 74 is mounted fixedly in position on the anvil 72 by suitable means such as a plurality of mounting bolts extended upwardly through the anvil and threaded into the retaining member 74. One such bolt 76 is shown in FIG. 6.

A workpiece holder 77 is included in the die assembly 55. The workpiece holder 77 is mounted on the plate 71 by means of a plurality of studs such as the studs 78. The stud 78 is provided with an enlarged head 79 that fits within a corresponding socket in a workpiece holder 77. The principal length of the stud 78 is of smooth external configuration and extends downwardly through an aperture in the workpiece holder 77. The stud 78 is mounted in position on the plate 71 by means of a threaded extension engaged in a corresponding threaded aperture in the mounting plate. One or more resilient members, such as the spring 81, bias the workpiece holder 77 upwardly to maintain it in the position shown in FIG. 6. The workpiece holder 77 is provided with a central cavity 82 for receiving and supporting a metal base member in predetermined position in the press. In the construction illustrated in FIG. 6, the cavity 82 conforms to the external configuration of a metal base member such as the base member 31, shown mounted in the cavity 82 of the workpiece holder 77.

The compression head assembly 61 of the compaction press 50 comprises a main frame or housing 84 that is secured to the rack member 59 by means of a plurality of mounting screws 85. The sealing guide member 65 is slidably mounted within the frame 84 of the compression head 61. The guide member 65 is biased downwardly toward the cavity 82 in the workpiece holder 77 by means of a compression spring 89 that is disposed within the housing 84. The downward limit of movement of the guide member 65, relative to the fixed structure of the compression head 61, is defined by a shoulder 91 on the guide member that is positioned to engage a corresponding shoulder 92 of the compression head housing.

The guide member 65, at its lower end, has a surface configuration that conforms to the surface configuration of the interior of the base member 31. In this instance, the guide member 65 has a shoulder 90 that engages the flange portion 33 of the base 31. From the shoulder 90, a relatively thin annular sealing portion 93 projects downwardly into the base member 31 to engage the upwardly facing surface of the base member encompassing the aperture 37.

The guide member 65 is provided with an axial guide aperture 95. A compression ram 96 projects axially of the aperture 95. The upper end of the compression ram 96 is affixed to the lower portion of the rack member 59, which comprises the upper end of the compression head assembly 61. Mounting of the compression ram 96 on the rack member 59 may be effected by any suitable means, such as a plurality of mounting screws 97. The ram 96, in turn, is provided with an axial aperture 99 that affords a receptacle for an auxiliary locating and guide member 101. The auxiliary guide member 101 is of substantially needle-like configuration. The lower end of the guide 101 includes a tip 102 for centering the member 101 in the upper end of the cylindrical conductor 35 (see FIG. 7). An enlarged head or shoulder 103 is provided on the upper end of the auxiliary guide member 101. The shoulder 103 is engaged by a spring 104 that biases the auxiliary guide member downwardly with respect to the ram 96. The downward movement of the guide member 101 relative to the ram is limited by engagement of the head 103 with an internal shoulder 105 of the ram 96.

The glass powder dispensing or depositing device 63 comprises a hopper or receptacle 111 that is mounted upon the support bracket 62. The receptacle has a lower outlet opening 112 that may be closed by a slide 113. The slide 113 is provided with a transverse chamber 114 which is shown in alignment with the opening 112 of the receptacle 111. The slide 113 can also be moved, as described hereinafter, to bring the chamber 114 into alignment with an opening 115 in the base or bracket member 62 that is connected to the conduit 64. The other end of the conduit 64 is connected to a passage 116 that extends angularly through the main sealing guide member 65 and connects directly to the guide aperture 95 therein. The slide 113 of the dispensing device is provided with a connecting member 117 that is connected to the armature 118 of the solenoid 66. The armature 118 is normally held in the position shown in FIG. 6 by suitable means, such as a spring 119, but is slidably movable to the left, as seen in FIG. 6, to effect a dispensing operation as described in further detail hereinafter.

The vibrating means 69 may be of relatively simple construction. In the form shown in FIG. 6, it comprises a solenoid 121, energized through a limit switch 120, that is mounted directly on the top of the rack member 59 that comprises the principal driving means for the compacting press. Thus, it is seen that the solenoid 121 is directly mechanically connected to the compression head assembly 61 of the press. The solenoid 121 is provided with an armature 122 that is normally suspended in spaced relation to the rack member 59 by suitable means such as a mounting bracket 123 and a suspension spring 124. Upon energization of the solenoid 121, the armature 122 may be driven downwardly to apply a vibration blow to the rack member 59, and hence to the compression head 61, as described hereinafter. At the downward limit of its travel, the movement of the armature opens the limit switch 120, releasing the armature to move upward in response to the spring 124. It is thus seen that the device 69 is a self-oscillating mechanism, the frequency depending upon the weight of the armature 122, the adjustment of the switch arm 120A, and the spring 124.

When the compacting press 50 is placed in operation, the operating handle 57 (FIG. 5) is rotated to the position shown in FIG. 5, the consequent rotation of the spur gear 58 driving the rack member 59 upwardly. This elevates the compression head assembly 61 a substantial distance from the die assembly 55, affording convenient access to the cavity 82 in the workpiece holder 77. A suitable workpiece, in this instance the base member 31, is then positioned in the cavity 82 as shown in FIG. 6. A conductor 35 is then mounted in the central aperture of the cylindrical die 75. The bottom of the conductor 35 is supported upon the pressure block 73. It should be noted that the cylindrical die 75 and the conductor 35 effectively close off the bottom of the axial aperture 37 in the base member 31.

With the base member 31 in position, and the conductor 35 held in the die 75, the operating handle 57 of the press is rotated in a counterclockwise direction, as seen in FIG. 5. As a consequence, the spur gear 58 drives the rack member 59 downwardly, driving the compression head assembly 61 toward the position of FIG. 6. As the compression head assembly moves downwardly, the auxiliary guide pin 101 engages the upper end of the cylindrical conductor 35 as shown in FIGS. 6 and 7. With the auxiliary guide pin thus seated on the conductor, downward movement of the guide pin is halted but the downward movement of the remainder of the compression head 61 is not interrupted. Rather, the spring 104 is compressed during the remainder of the compaction stroke of the press.

Further movement of the compression head assembly 61 along its compression stroke seats the sealing and guide member 65 in the base member 31 in the position shown in FIG. 6. The sealing and guide member 65 holds the workpiece 31 firmly in position in the holder 77. It also seals off the central aperture 37 of the base member 31. Continued downward movement of the guide member 65 is now arrested by its engagement with the base member 33. However, the housing 84 and the compression ram 96 of the compression head assembly can still move downwardly against the biasing force afforded by the spring 89. In FIG. 6, the apparatus is shown just after the sealing and guide member 65 has engaged the workpiece 31, relative movement between the guide member 65 and the frame or housing 84 of the compression head having just commenced.

With the press in the position shown in FIG. 6, the solenoid 66 is energized, driving the armature 118 to the left against the bias afforded by the spring 119. Movement of the armature 118 causes a corresponding movement of the slide 113, closing off the aperture 112 in the bottom of the receptacle 113 of the glass powder dispensing device 63. The continued movement of the slide brings the measuring chamber 114 into alignment with the aperture 115 that leads to the conduit 64. Accordingly, a measured quantity of glass powder is dispensed through the conduit 64 and the passage 116 into the guide aperture 95 of the guide member 65. Glass powder falls downwardly through the guide aperture 95 and is deposited in the desired location for the formation of an insulator. That is, the glass powder is deposited in the central aperture 37 of the base member 31 in encompassing relation to the central conductor 35. Energization of the solenoid 66 should be limited to a portion of the operating cycle of the press immediately following the engagement of the guide member 65 with the press. Actuation of the solenoid may be effected by means of a suitable limit switch 67 (see FIG. 5) or any other convenient means for sensing movement of the press to the desired portion of its operating stroke.

Following dispensation of the glass powder through the guide aperture 95, the downward movement of the compression head is continued by operation of the handle 57. Accordingly, the compression ram 96 is driven downwardly through the axial guide aperture 95, compressing the glass powder 39A. The powder 39A is compressed to a relatively high density, preferably to approximately 95% or more of its theoretical maximum density. This is accomplished by driving the press to the position illustrated in FIG. 8. Glass powder 39A is compacted around the conductor 35 and into intimate contact with the surface of the conductor and with the inner wall of the aperture 37 in the workpiece 31.

Preferably, the vibrating device 67 is energized as soon as the compression stroke of the press is initiated. The solenoid 121 may be energized, for example, by an alternating signal of 20 cycles per second or even lower, or as high as 600 cycles per second or more. Energization of the solenoid 121 causes the armature 122 to deliver a series of low-amplitude driving blows to the top of the rack member 59. These blows are transmitted through the rack member to the compression head assembly 61 and to the dispensing device 63, since the latter is supported from the compression head of the press. The resultant vibration of the compression assembly, and particularly the guide member 65 and ram 96, provides for even distribution of the glass powder 39A around the central conductor 35 before it is compressed by the ram 96. Furthermore, the vibration of the ram 96 during the final compression of the stroke provides for compaction of the glass powder to a higher density than could otherwise be realized.

The vibrating device 69 affords a further advantage relating to operation of the dispensing device 63. Finely powdered materials of the kind handled in the press 50 tend to resist flow, particularly where gravity is the basic agency relied upon for dispensation of the powder. The vibration of the dispensing apparatus 63, the compression head 61, and the tube 64, however, assure substantially complete transfer of the measured quantity of glass powder from the dispensing device to the desired position indicated by the powder 39A. It is thus seen that the vibrator 69 provides a dual function, assisting both in dispensation of the glass powder and in compaction thereof.

As noted above, it is undesirable to scatter any of the glass powder on any of the surfaces of the base assembly for the electrical enclosure, outside of the area in which the insulator 39 is to be formed (see FIG. 4). Any such undesired glass deposits are prevented, with the construction illustrated in FIG. 6, by the guide members of the press. Thus, the auxiliary guide member 101 completely closes off the upper end of the tubular conductor 35. The lower portion 93 of the guide member 65, on the other hand, prevents contact of the glass with the inner surfaces of the main portion of the metal base member 31. This construction makes it possible, in a practical manufacturing device, to provide for compaction of the glass in situ on the base member 31 without contaminating the enclosure to be constructed with this base member. The die member 75 and the compression ram 96 determine the ultimate configuration of the compacted glass powder 39A.

After compaction of the glass powder 39A, the direction of movement of the operating handle 57 for the press is reversed, and the press is returned to the position illustrated in FIG. 5. The workpiece holder 77 is then pressed downwardly, against the bias of the spring 81, exposing the assembly comprising the base member 31, the conductor 35, and the compacted glass powder 39A. The workpiece assembly can then be conveniently removed from the base assembly 55 of the press and immediately fired to vitrify the glass powder. Convenience of removal of the assembly from the press is an important factor, because time is an essential matter once the compaction operation has started. Thus, it should be noted that the glass powder is quite limited in its contact with the atmosphere during the compression operation as described above. By thus limiting access of the atmosphere to the powder, and shortening the total time for the compression operation and removal of the assembly from the press, excessive adsorption of water or other contaminants from the atmosphere into the glass powder is prevented. This is an important factor in preventing bubble inclusions and other defects in the completed insulator 39 (see FIG. 4). Of course, once the first workpiece has been removed from the press, the workpiece holder 77 can be released to return to the position shown in FIG. 6. The press 50 is then ready for the next operation.

The auxiliary guide member 101 is effective to seal off the end of the tubular conductor 35, preventing discharge of glass powder thereinto, as noted above. If a solid conductor is used, and the conductor projects into the base member, no auxiliary guide is employed, as in the embodiment of FIGS. 9 and 10 described hereinafter. However, if a short solid conductor, otherwise comparable to conductor 35, is used, it may be desirable to use an auxiliary guide, like guide member 101, but with a flat end, to prevent glass powder from entering the recess in the annular compression ram at the start of the compaction engagement of the ram with the powder.

FIGS. 9 and 10 illustrate, in views similar to FIGS. 6 and 8 respectively, a modified compression head assembly 161 and a modified die block assembly 155 that may be utilized in the press 50 in place of the assemblies 61 and 55, respectively, in the fabrication of the housing base comprising the member 11 of FIGS. 1–3. As shown in FIG. 9, the die block assembly 155 comprises an anvil 172 mounted upon the base portion 52 of the press frame. The anvil 172 is rotatably mounted upon the press frame, the axis of rotation being generally indicated at 171. The upper portion of the anvil 172 comprises a pressure block 173 upon which a die 175 is mounted. The die 175 is held in position on the anvil by a die retaining member 174 that is mounted in place by suitable means such as a plurality of mounting bolts 176.

The anvil 172 further supports a workpiece holder 177. The workpiece holder 177 is mounted on the anvil by means of a plurality of studs 178, of which only one is shown in the drawing. Each of the studs 178 is affixed to the workpiece holder 177, preferably being threaded into the workpiece holder. The principal length of the stud 178 is of smooth external configuration, and this portion of the stud extends downwardly through a corresponding aperture in the anvil 172, terminating at an enlarged head 179 that fits within a socket in the anvil. A spring 181 is disposed in encompassing relation to a portion of the stud 178; this spring, and the other similar springs, bias the workpiece holder 177 upwardly to maintain in the position shown in FIG. 9. The workpiece holder 177 is provided with a central cavity 182 for receiving and supporting a metal base member in operating position in the press. In this instance, the configuration of the cavity 182 matches that of the base member 11, which is shown mounted in position in the cavity 182 in FIGS. 9 and 10. It should be noted that the workpiece holder 177 supports the housing base member 11 in alignment with the die 175, the latter including two die elements that projects upwardly into the two apertures in the bottom of the base member 11.

The compression head assembly 161 illustrated in FIG. 9 includes the frame or housing member 84 that is secured by the mounting screws 85 to the lower portion of the rack member 59 of the press. The compression head frame 84 supports a sealing guide member 165 that is generally similar to but specifically different from the sealing guide member 65 of the previously described embodiment. The guide member 165, as before, is biased downwardly toward the die assembly 155 by means of the compression spring 89. The limit of downward movement of the guide member 165, relative to the compression head housing 84, is again established by a shoulder 91 on the guide member that is positioned to engage a corresponding shoulder 92 of the compression head housing.

The lower end of the guide member 165 has a configuration that matches that of the interior of the base member 11. Thus, the guide member 165 has a shoulder 190 that engages the flange portion 14 of the base 11. An annular sealing portion 193 projects downwardly into the base member 11 to engage the upwardly facing surface of the base member encompassing one of the feed-through apertures in the base member, in this instance the aperture 17.

The guide member 165 is provided with an axial guide aperture 195 through which a compression ram 196 projects. As before, the upper end of the compression ram 196 is affixed to the lower portion of the rack member 59 by suitable means such as the mounting screws 97. This embodiment does not include an axial auxiliary guide such as the guide member 101 of the embodiment of FIGS. 6–8. However, the lower end of the compression ram 196 is provided with an axially extending aperture 199 for receiving a conductor 15 positioned within the base 11 and extending through the aperture 17 in the base. In this instance, the conductor 15 extends axially through one die element of the die 175 and downwardly through an elongated aperture 201 in the anvil 172. With the die assembly 155 in the position shown in FIG. 9, the aperture 201 is aligned with a corresponding aperture 202 in a cutting die 203 that is mounted in the base 52 of the press frame. Access to the cutting die 203 is provided by a small aperture 204 in the base of the press frame.

The sealing guide member 165 is again provided with an angular opening to which the last dispensing conduit 64 is connected, this opening leading into the guide aperture 195. As before, the conduit 64 is connected to the glass powder dispenser 63. The guide member 165 is also provided with an additional guide aperture 205 for receiving a second conductor as described more fully hereinafter.

Operation of the modifications of FIGS. 9 and 10 is substantially similar to that of the previously described embodiment. At the outset, a metal base member 11 is positioned in the receiving aperture 182 of the workpiece holder 177. A length of conductor wire is advanced through the aperture 204 in the base of the press and through the cutting die aperture 202 and the anvil aperture 201 up through the feed-through opening 17 in the base of the workpiece 11. The conductor is pushed high enough to project well above the inner surface of the base member 11.

Of course, the press starts from the elevated position of FIG. 5 and, once the workpiece and conductor are properly located, the head of the press is lowered by rotation of the operating handle 57. As the compression head assembly 161 descends, the sealing guide member 165 engages the workpiece 11 and seats itself in an encompassing and sealing relation to the feed-through aperture 17 with the conductor 15 projecting upwardly into the guide aperture 195. As soon as the sealing guide member 165 is seated, the glass powder dispenser is triggered to discharge a measured quantity of glass powder down into the conduit 64 and the guide aperture 195 into the aperture 17 in the base member 11. Preferably, this is accomplished immediately upon seating of the guide member 165 on the base member 11.

The continued downward movement of the compression head assembly 161 now results in relative movement of the compression ram 196 with respect to the guide member 165. That is, the compression ram is driven downwardly through the guide aperture 195 against the biasing force afforded by the spring 89, movement of the guide member being arrested by engagement with the workpiece 11. The ram 196 compresses the glass powder in the aperture 17 of the base member, compacting it to a high density and into intimate contact with the conductor 15 and with the surface of the base member 11 facing into the aperture 17. As the compression ram moves downwardly, the upwardly projecting portion of the conductor 15 is received within the opening 199 in the ram. Of course, during the entire glass deposition and compression operation, the vibrator 69 (FIG. 5) is actuated to facilitate both operations. The final compression position of the press is shown in FIG. 10.

When the initial compaction operation has been effected, within the feed-through aperture 17 of the base member 11, the head 161 of the press is raised. The die assembly 155 is then rotated about the center line 171. The rotation of the die assembly 155 cuts off the lower portion of the conductor affording the conductor 15 at the cutting die 203. The die assembly is rotated to bring the second base aperture 18 of the workpiece 11 into alignment with the compression ram 196. That is, the die assembly is rotated through an angle of 180°.

The entire operation is now repeated, with respect to the second aperture in the base member 11. That is, the wire is again advanced through the base opening 204 and the die opening 202 and upwardly through an additional aperture 206 in the anvil 172 until it projects upwardly through the opening 18 in the base member 11. The glass depositing and compression operation is then repeated as above. In this instance, the first conductor 15, already held in place by the compacted glass in the opening 17 of the base member 11, is received in the auxiliary opening 205 of the guide and sealing member 165.

When the second glass-compacting operation has been completed, the head of the press is raised. The workpiece holder 177 is then pressed downwardly against the bias afforded by the supporting springs 181, permitting quick and convenient removal of the assembly comprising the base member 11. Before this is done, the die assembly 155 should again be rotated to cut off the second conductor. The assembly comprising the base member 11 is then fired as described hereinabove.

From the foregoing description, it will be apparent that the compacting press of the present invention affords a rigid yet highly effective operation in a press that can be conveniently adapted to a variety of different base member configurations by variation of the die assembly 155 and the compression head assembly 161. In all instances, the glass powder is restricted to the desired area in the base member, and is also protected against contact with the atmosphere for any prolonged period of time. Scattering of glass powder within the housing base member being fabricated is prevented by the guide members of both embodiments described hereinabove. Furthermore, in each instance, the deposition of the glass powder and the compaction thereof are both materially aided by the operation of the vibrator 69. Although a manually operable press is shown and described, it will be clear that a suitable automatic drive can also be used and that any manual operation of the press can be made automatic as desired. Moreover, it will be apparent that the press can be used to fabricate individual or plural compressed powder elements merely by minor changes in the operating mechanisms.

Hence, while preferred embodiments of the invention have been illustrated and described, it is to be understood that they are capable of variation and modification, and we therefore do not wish to be limited to the precise details set forth, but desire to avail ourselves of such changes and alterations as fall within the purview of the following claims.

We claim:

1. A compacting press, for use in the manufacture of a compressed powder element of predetermined size and configuration at a given location on a base member, comprising: means for mounting the base member in predetermined position; a guide member, having a guide aperture therein, movable between an initial position displaced from the base member and a second position in which the guide member effectively engages the base member to afford a closed passageway comprising said guide aperture aligned with said given location on the base member; depositing means connected to said guide aperture for depositing a predetermined quantity of powder at said given location on said base member through a given portion of said guide aperture of said guide member; operating means for operating said depositing means; a compression ram, movable through said guide aperture between an initial position displaced from the base member and a compression position in which the ram engages the powder to compress all of the powder in situ on said base member; and actuating means for moving said guide member to its second position, actuating said operating means for operating said depositing means, and moving the compression ram to its compression position, in the recited sequence.

2. A compacting press, for use in the manufacture of a vitreous compressed powder element of predetermined size and configuration in an aperture in a metal base, comprising: a die member; means for mounting the metal base in predetermined position with said aperture in the metal base aligned with the die member; a sealing guide member, having a guide aperture therein, movable between an initial position displaced from the metal base and a sealing position in which the guide member effectively engages the metal base to afford a closed passageway comprising said guide aperture aligned with said aperture in the base; depositing means connected to said guide aperture for depositing a predetermined quantity of glass powder at said given location on said metal base through said guide aperture of said guide member; operating means operating said depositing means; a compression ram, movable in a compression stroke through said guide aperture in said guide member between an initial position displaced from the metal base and a compression position engaging the glass powder to compress all of the glass powder against the die member in situ in said aperture in said metal base; actuating means for moving said guide member to its sealing position, actuating said operating means for operating said depositing means, and moving the compression ram through its compression stroke to its compression position, in the recited sequence; and means for vibrating said compression ram during the compression stroke.

3. A compacting press, for use in the manufacture of a vitreous compacted powder element of predetermined size and configuration in an aperture in a metal base, with a conductor projecting therethrough, comprising: means, including a die member, for supporting the conductor in predetermined position; means for mounting the metal base in predetermined position on said die member with said conductor projecting through said metal base aperture, said die member, said conductor, and said metal base member defining an enclosed chamber open only in one direction; a sealing guide member, having a guide aperture therein, movable in said given direction between an initial position displaced from the metal base and a sealing position in which the guide member effectively engages the metal base with said guide aperture aligned with said base aperture, the rim of said guide member sealing off an extension of said enclosed chamber; depositing means connected to said guide aperture for depositing a predetermined quantity of glass powder in said chamber through said guide aperture of said sealing guide member; operating means for operating said depositing means; a compression ram, movable through said guide aperture in said given direction between an initial position displaced from said chamber and a compression position engaging the glass powder to compress the glass powder, in situ, into contact with the conductor and the aperture wall of the metal base; and actuating means for moving said sealing guide member to its sealing position, actuating said operating means for operating said depositing means, and moving the compression ram to its compression position, in the recited sequence.

4. A compacting press, for use in the manufacture of a vitreous compacted powder element of predetermined size and configuration at a given location on a base member, comprising: means for mounting the base member in predetermined position; a sealing guide member, having a guide aperture therein, mounted for movement along a given axis between an initial position displaced from the base member and a sealing position in which the sealing member effectively engages the base member with said guide aperture coaxially aligned with said given location on the base, said sealing guide member having a rim sealing off said guide aperture from the surrounding surface of the base member; depositing means connected to said guide aperture for depositing a predetermined quantity of glass powder at said given location on said base member by gravity flow through said guide aperture of said sealing guide member; operating means for operating said depositing means; a compression ram, movable axially through said guide aperture, when said sealing guide member is in sealing position, between an initial position displaced from the base member and a compression position engaging the glass powder to compress the glass powder in situ on said base member; actuating means for moving said sealing guide member to its sealing position, actuating said operating means for operating said depositing means, and moving the compression ram to its compression position, in the recited sequence; and means for vibrating said compression ram, during its compression movement, by applying a series of low-amplitude driving blows thereto, along said axis, said vibrating means also serving to vibrate said depositing means and assure complete discharge of the predetermined quantity of glass powder onto said base member.

5. A compacting press, for use in the manufacture of an annular vitreous compacted powder element of predetermined size in a feedthrough aperture in a metal base, said vitreous element having a conductor projecting therethrough, comprising: means for mounting the metal base and conductor in predetermined aligned position relative to each other with the conductor projecting through said feedthrough aperture; a sealing guide member, having a guide aperture therein, mounted for movement between an initial position displaced from the metal base and a second position in which the sealing guide member effectively engages the metal base to afford a closed passageway comprising said guide aperture aligned with said feedthrough aperture in the base; depositing means connected to said guide aperture for depositing a predetermined quantity of glass powder in said given feedthrough aperture in said metal base through said guide aperture of said sealing guide member, operating means for operating said depositing means; a compression ram, movable through said guide aperture between an initial position displaced from the metal base and a compression position engaging the glass powder to compress all of the powder in situ in said metal base, said ram including an axial aperture for receiving said conductor; actuating means for moving said guide member to its second position, actuating said operating means for operating said depositing means, and moving the compression ram to its compression position, in the recited sequence; and means for vibrating said compacting press during deposition of the glass powder and during compaction thereof.

6. A compacting press for use in the manufacture of a compressed powder element of predetermined size and configuration at a given location on a base member, comprising: a frame; means, mounted on said frame, for supporting the base member in predetermined position thereon; a compression head, mounted upon said frame and movable through a predetermined compression stroke, along a given axis, from an initial position toward the base member; a guide member mounted in said compression head and movable axially thereof, said guide member having an axial guide aperture aligned with said given location on the base member; bias means biasing said guide member in an axial direction toward the base member; a compression ram mounted on said compression head and projecting axially of said guide aperture in said guide member; depositing means connected to said guide aperture for depositing a predetermined quantity of powder into said guide aperture of said guide member; driving means for driving said compression head through said compression stroke, movement of said guide member being arrested by engagement with the base member in a medial portion of the compression stroke, after which the compression head and compression ram continue movement toward the base member against the biasing force of said bias means; and means for actuating said depositing means to deposit the powder when said guide member has engaged the base member and before completion of the compression stroke of the compression ram, whereby said compression ram compacts the deposited powder, in situ on the base member, to predetermined size and configuration.

7. A compacting press for use in the manufacture of a compressed vitreous powder element of predetermined size and configuration in a feedthrough aperture of a metal base member, with a conductor projecting axially therethrough, comprising: a frame; means, mounted on said frame, for supporting the base member and conductor in aligned position thereon with the conductor projecting through said feedthrough aperture; a compression head, mounted upon said frame and movable through a predetermined compression stroke, along a given axis, from an initial position toward the base member; a first guide member mounted in said compression head and movable axially thereof, said first guide member having a first axial guide aperture; a compression ram mounted on said compression head and projecting axially into said first guide aperture in said first guide member, said compression ram including a second guide aperture extending axially thereof in alignment with the conductor; an auxiliary guide member extending through said second guide aperture; bias means biasing each of said guide members in an axial direction toward the base member; depositing means connected to said first guide aperture for depositing a predetermined quantity of glass powder into said feedthrough aperture through a portion of said first guide aperture between said compression ram and said base member; driving means for driving said compression head through said compression stroke, movement of said auxiliary guide member being arrested by engagement with the conductor and movement of said first guide member being arrested by engagement with the base member in a medial portion of the compression stroke, after which the compression head and compression ram continue movement toward the base member against the biasing force of said bias means; and means, included in said driving means, for actuating said depositing means when said guide members have both been arrested in movement and before completion of the compression stroke of the compression ram, whereby said compression ram compacts the deposited powder, in situ on the base member, to predetermined size and configuration.

References Cited in the file of this patent

UNITED STATES PATENTS

| | | |
|---|---|---|
| 1,291,400 | Casella | Jan' 14, 1919 |
| 1,302,237 | Sokolow et al. | Apr. 29, 1919 |
| 1,815,721 | McGraw | July 21, 1931 |
| 1,979,156 | Hettel | Oct. 30, 1934 |
| 2,366,780 | Gelbman et al. | Jan. 9, 1945 |
| 2,586,210 | Corwin | Feb. 19, 1952 |
| 2,889,578 | Roberts | June 9, 1959 |
| 3,020,589 | Maritano | Feb. 13, 1962 |
| 3,050,809 | Kupka | Aug. 28, 1962 |